(12) United States Patent
Vodrahalli et al.

(10) Patent No.: US 6,778,750 B2
(45) Date of Patent: Aug. 17, 2004

(54) POLARIZATION-INSENSITIVE PLANAR LIGHTWAVE CIRCUITS AND METHOD FOR FABRICATING THE SAME

(75) Inventors: Nagesh K. Vodrahalli, Cupertino, CA (US); Achintya K. Bhowmik, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/185,219

(22) Filed: Jun. 26, 2002

(65) Prior Publication Data

US 2004/0001663 A1 Jan. 1, 2004

(51) Int. Cl.[7] .............................. G02B 6/10; G02B 6/34; G02B 6/12
(52) U.S. Cl. .......................... 385/130; 385/11; 385/14; 385/37
(58) Field of Search ...................... 385/11, 37, 129–131

(56) References Cited

U.S. PATENT DOCUMENTS

| | | | |
|---|---|---|---|
| 5,341,444 A | * 8/1994 | Henry et al. | 385/11 |
| 5,623,571 A | * 4/1997 | Chou et al. | 385/130 |
| 6,400,872 B1 | 6/2002 | Gehler | |
| 6,529,660 B2 | * 3/2003 | Nakajima | 385/37 |
| 6,690,855 B2 | * 2/2004 | Thompson et al. | 385/27 |
| 2002/0181868 A1 | * 12/2002 | McGreer | 385/37 |
| 2002/0181870 A1 | * 12/2002 | Inoue et al. | 385/37 |

FOREIGN PATENT DOCUMENTS

| | | |
|---|---|---|
| EP | 0 730 170 A2 | 9/1996 |
| EP | 1 191 364 A1 | 3/2002 |

OTHER PUBLICATIONS

Y. Inoue et al., "Novel Birefringence Compensating A WG Design," Optical Fiber Communication Conference, Technical Digest Postconference Edition, Trends in Optics and Photonics Series, Mar. 17–22, 2001, vol. 54, pp. WB4–1—WB4–3, XP: 010546335, USA.

* cited by examiner

*Primary Examiner*—Edward J. Glick
*Assistant Examiner*—Thomas R Artman
(74) *Attorney, Agent, or Firm*—Kevin A. Reif

(57) ABSTRACT

A planar lightwave circuit comprises a plurality of waveguides formed with a geometrical or refractive index properties that renders the planar lightwave circuit substantially polarization insensitive.

12 Claims, 5 Drawing Sheets

POLARIZATION-INSENSITIVE PLANAR LIGHTWAVE CIRCUITS AND METHOD FOR FABRICATING THE SAME

BACKGROUND OF THE INVENTION

1. Field of the Invention

The described invention relates to the field of optical systems. In particular, the invention relates to polarization-insensitive planar lightwave circuits.

2. Description of Related Art

Planar lightwave circuits (PLCs) are systems that include, but are not limited to, waveguides, light sources, and/or detectors in the plane of the circuit. PLCs often have been based on silica-on-silicon (SOS) technology, but may alternatively be implemented using other technologies such as, but not limited to, silicon-on-insulator (SOI), compound semiconductor systems such as InGaAs and InP, polymers, etc.

FIG. 1 is a schematic diagram that shows a typical SOS architecture. A layer of lower cladding 12 is typically deposited onto a substrate 10. A waveguide core layer 20 is deposited over the lower cladding 12, and an upper cladding 24 is deposited over the waveguide core layer 20. In one example, the substrate 10 is silicon, the lower cladding 12 is $SiO_2$, the core layer 20 is $SiO_2$ doped with Germanium, and the upper cladding 24 is a borophosphosilicate glass (BPSG).

One issue with planar lightwave circuits, and SOS-based devices in particular, is the birefringence in the waveguides. Birefringence may arise due to thin-film stress and makes these devices polarization sensitive. Thus, the output of the PLC may vary dependent upon the polarization of the input light.

FIG. 2 is a schematic diagram that shows a prior art method of reducing the polarization sensitivity of a planar lightwave circuit, such as that described in *Polarization Mode Converter with Polyimide Half Waveplate in Silica-Based Planar Lightwave Circuits*, IEEE Photonics Technology Letter, Vol. 6, No 5, May 1994 by Inoue, Ohmori, Kawachi, Ando, Swada, and Takahashi. A groove 30 is cut into the middle of a planar lightwave circuit 32, and a rectangular half waveplate is inserted into the groove. The half waveplate 40 is angled at a 45-degree angle with the plane of the substrate of the planar lightwave circuit. An optical input 50 traverses the first half of the PLC, and is mode converted by the half waveplate before traversing the second half of the PLC. This results in an output 52 of the PLC that is polarization insensitive.

However, due to lack of lateral optical confinement in the half waveplate, the mode profile of the optical signal expands and results in excess loss in the device. To minimize the loss, an extremely thin half waveplate is used. In one case, the half waveplate is approximately 15 microns thick. However, the reduced thickness of the half waveplate is limited due to fragility, thickness uniformity, and handling difficulties. Additionally, this solution is labor-intensive and is prone to loss at the interface.

DETAILED DESCRIPTION

A method and apparatus for reducing the polarization sensitivity of a planar lightwave circuit is disclosed. A planar lightwave circuit comprises an input optical path, an output optical path, and a plurality of waveguides coupling the input optical path to the output optical path. The plurality of waveguides has geometrical or refractive index properties that make the plurality of waveguides substantially polarization insensitive.

Polarization dependence in a planar lightwave circuit (PLC) results from a difference in refractive indices for light polarized in the directions parallel and perpendicular (TM and TE) to the plane of the PLC. A device based on optical interferometry that utilizes a plurality of optical waveguide branches, such as an arrayed waveguide grating (AWG), is polarization insensitive if the following equation is satisfied:

$$\int_0^{l_i} (n_{TM} - n_{TE}) dl_i = const \qquad \text{Equation 1}$$

where $n_{TM}$ and $n_{TE}$ are the refractive indices for TM and TE polarized light, respectively, i=1, 2, 3, . . . up to the number of waveguides of the PLC, and $l_i$ is the length of the ith waveguide.

Equation 1 comprises three birefringence components due to 1) thermal coefficient mismatch induced stress ($I_1$), 2) geometry of the waveguides ($I_2$), and 3) composition dependent refractive index ($I_3$), wherein the PLC is substantially polarization insensitive if the three birefringence components satisfy the equation:

$$I_1 + I_2 + I_3 = \int_0^{l_i} (n_{TM} - n_{TE}) dl_i = const \qquad \text{Equation 2}$$

where:

$$I_1 = \frac{1}{2} n_0^3 q \int_0^{l_i} (\sigma_x - \sigma_y)_i dl_i,$$

Figure 9:
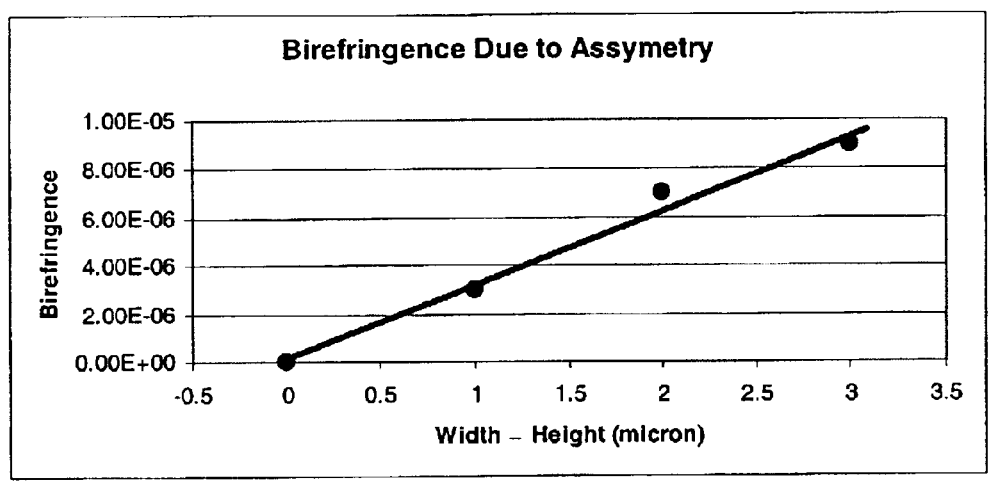
FIG. 9 is a graph showing example data illustrating a linear relationship between birefringence and asymmetry of the geometry of a waveguide.

-continued $$I_2 = m \int_0^{l_i} (W - H)_i dl_i,$$

$$I_3 = \int_0^{l_i} [n_{TM}(l_i) - n_{TE}(l_i)] dl_i,$$

and where $n_0$ is the refractive index of the unstressed medium, q is the photoelastic constant, $\sigma_x$ and $\sigma_y$ are the stresses along the x and y directions, m is the slope of birefringence versus asymmetry curve such as shown in FIG. 9, and W and H are the width and height of the $i^{th}$ waveguide, respectively.

The three birefringence components ($I_1$, $I_2$, and $I_3$) satisfy Equation 2 when (1) each of the birefringence components is zero or negligible, (2) each of the birefringence components is constant, or (3) the sum of the birefringence components is a constant.

Figure 1:
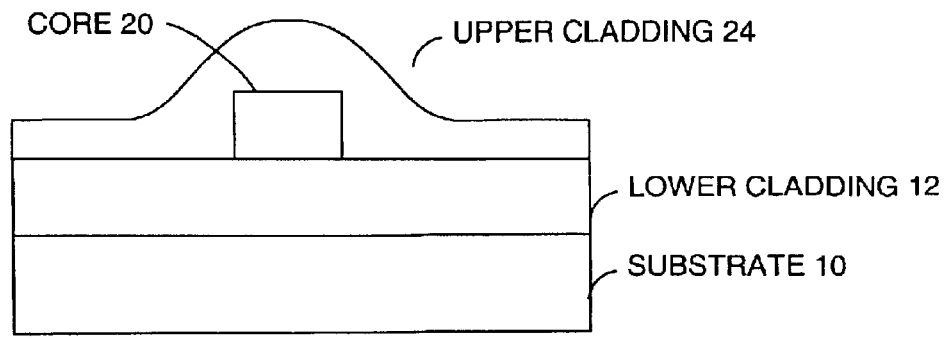
FIG. 1 is a schematic diagram that shows a typical SOS architecture.
Figure 2:
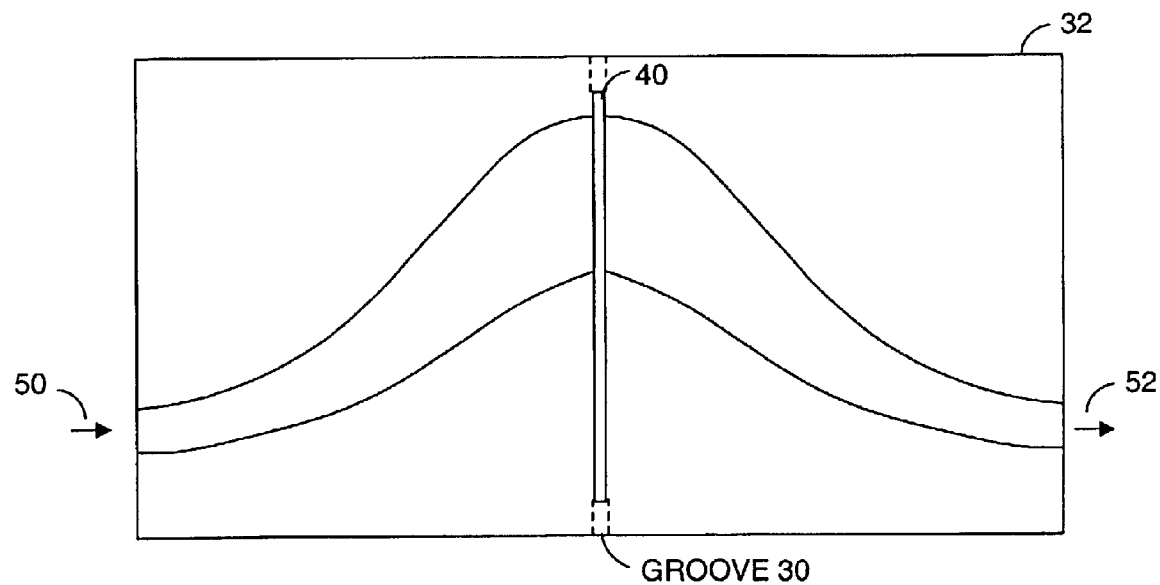
FIG. 2 is a schematic diagram that shows a prior art method of reducing the polarization sensitivity of a planar lightwave circuit.
Figure 3:
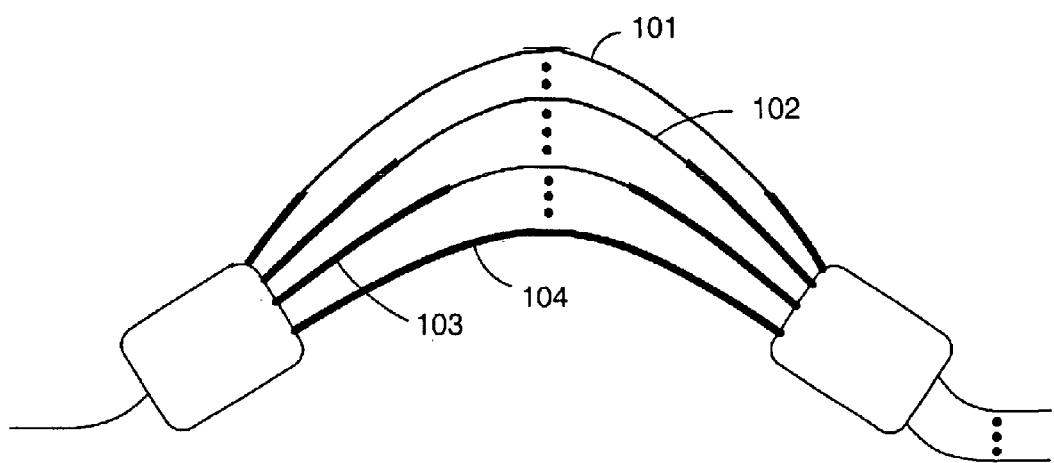
FIG. 3 shows one embodiment of a prior art array waveguide grating that has multiple waveguides that have been customized to reduce polarization sensitivity.

FIG. 3 shows one embodiment of a prior art array waveguide grating that has multiple waveguides 101–104 that have been customized to reduce polarization sensitivity, such as that described in *Novel birefringence compensating AWG design*, NTT Photonics Laboratories, ©2000 Optical Society of America by Inoue, Itoh, Hashizume, Hibino, Sugita, and Himeno. Each of the waveguides has a portion of its length having a first width W1 and a portion of its length having a second width W2, however, the ratio of portions having widths W1 and W2 varies among each of the waveguides. For example, waveguide 101 may have 20% of its length having width W1 and 80% of its length having width W2; waveguide 102 may have 40% of its length having width W1 and 60% of its length having width W2; waveguide 103 may have 65% of its length having width W1 and 35% of its length having width W2; and waveguide 104 may have 100% having width W1 and 0% having width W2. A disadvantage of this implementation is that the abrupt change in waveguide width from W1 to W2 results in additional optical signal loss.

Figure 4:
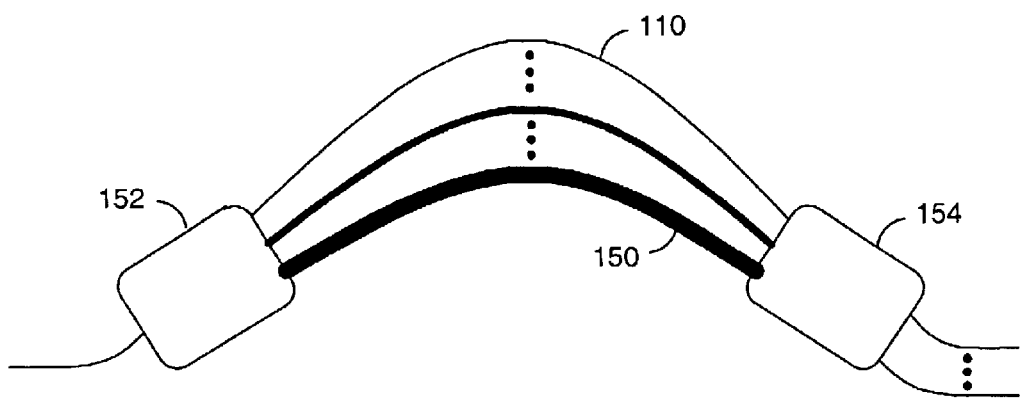
FIG. 4 is a schematic diagram that shows one embodiment of a PLC that has geometric properties that substantially render the PLC polarization insensitive.

FIG. 4 is a schematic diagram that shows one embodiment of a PLC that has geometric properties that substantially render the PLC polarization insensitive. In one embodiment, the PLC is an array waveguide grating having waveguides 110–150. However, the same techniques may be employed for any PLC.

An input optical path 152 provides an optical input signal to the waveguides 110–150, and an output optical path 154 receives an optical output signal from the waveguides 110–150. In one embodiment, each of the waveguides 110–150 have a constant width across its length, but the width is different for each of the waveguides. For example, the widths of the waveguides 110–150 may get progressively wider as the lengths of the waveguides decrease in length. The geometrical properties of the waveguide contribute to the geometrical birefringence component $I_2$ of Equation 2, and are designed to counteract the contributions from the thermal coefficient mismatch induced stress ($I_1$) and the composition dependent refractive index ($I_3$) to yield a substantially polarization insensitive PLC.

Figure 5:
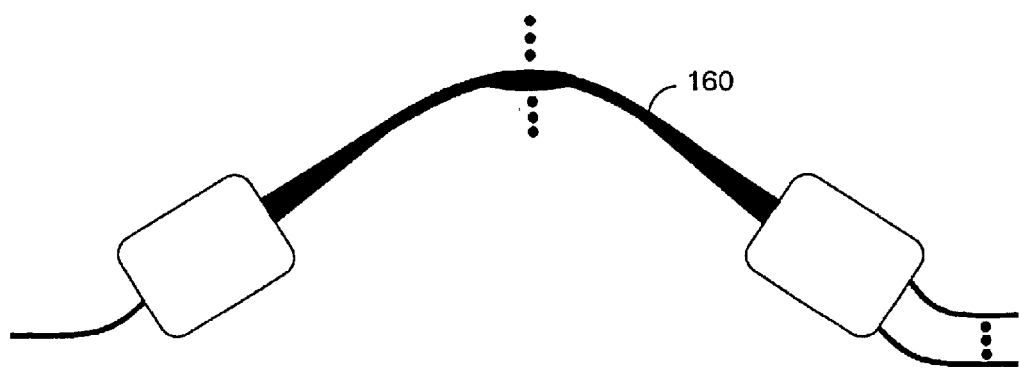
FIG. 5 is a schematic diagram that shows another embodiment of a PLC that has geometric properties that yield a substantially polarization insensitive PLC.

FIG. 5 is a schematic diagram that shows another embodiment of a PLC that has geometric properties that yield a substantially polarization insensitive PLC. In this embodiment, each of the waveguides, for example waveguide 160, vary continuously in width over a length of the waveguide, and the waveguide dimensions contribute to the geometrical component of birefringence ($I_2$) of Equation 2. In one embodiment, the widest width of the waveguide restricts the waveguide to single mode operation. Alternatively, the height of the waveguide may vary either additionally or instead of the width.

Figure 6:
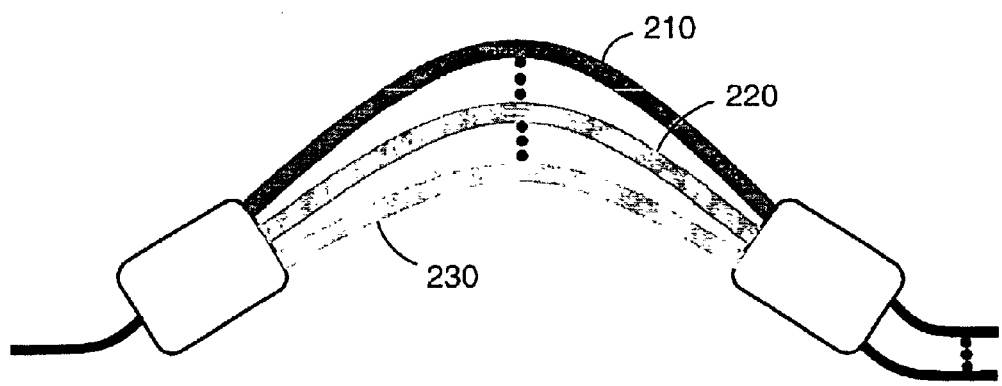
FIG. 6 is a schematic diagram that shows an embodiment of a PLC that uses a refractive index property of the waveguide to counteract the contributions from thermal coefficient mismatch induced stress ($I_1$) and geometry of the waveguides ($I_2$).

FIG. 6 is a schematic diagram that shows an embodiment of a PLC that uses a refractive index property of the waveguide to counteract the birefringence contributions from thermal coefficient mismatch induced stress ($I_1$) and geometry of the waveguides ($I_2$). In this embodiment, the index of refraction of the waveguide differs for each of the waveguides 210–230, but is constant throughout each individual waveguide. The refractive indices of the waveguides may be adjusted by controlling the dopant levels of the waveguides, e.g., by controlling mask openings during doping by, e.g., chemical vapor deposition (CVD), ion implantation, and so forth. Alternatively, the refractive index may be changed by selective UV writing or laser exposure.

Figure 7:
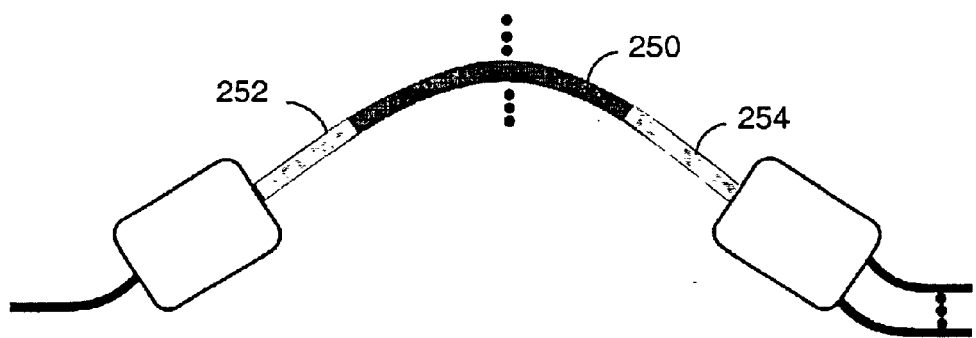
FIG. 7 is a schematic diagram that shows another embodiment of a PLC that uses a composition-dependent refractive index property of the waveguide to yield a substantially polarization insensitive PLC.

FIG. 7 is a schematic diagram that shows another embodiment of a PLC that uses a composition-dependent refractive index property of the waveguide to yield a substantially polarization insensitive PLC. In this embodiment, the refractive index of the individual waveguides varies as a function of length. For example, in one of the waveguides, the refractive index of a center portion 250 of a waveguide may have a higher refractive index than outlying portions 252, 254 of the waveguide. Although only one waveguide is shown, a similar structure may exist for all of the waveguides. The refractive indices of the waveguides may be adjusted as described with respect to FIG. 6. Within each of the waveguides, the refractive index may be changed in steps, or alternatively, the refractive index may vary smoothly across the length of the waveguide. In one embodiment, the refractive index is symmetrical from one side of a waveguide to the opposite side. However, the refractive indices of the waveguides need not be symmetrical. The birefringence composition-dependent refractive index component $I_3$ counteracts the birefringence components $I_1$ and $I_2$ to satisfy Equation 2. The PLC is insensitive to birefringence if Equation 2 is satisfied.

Figure 8:
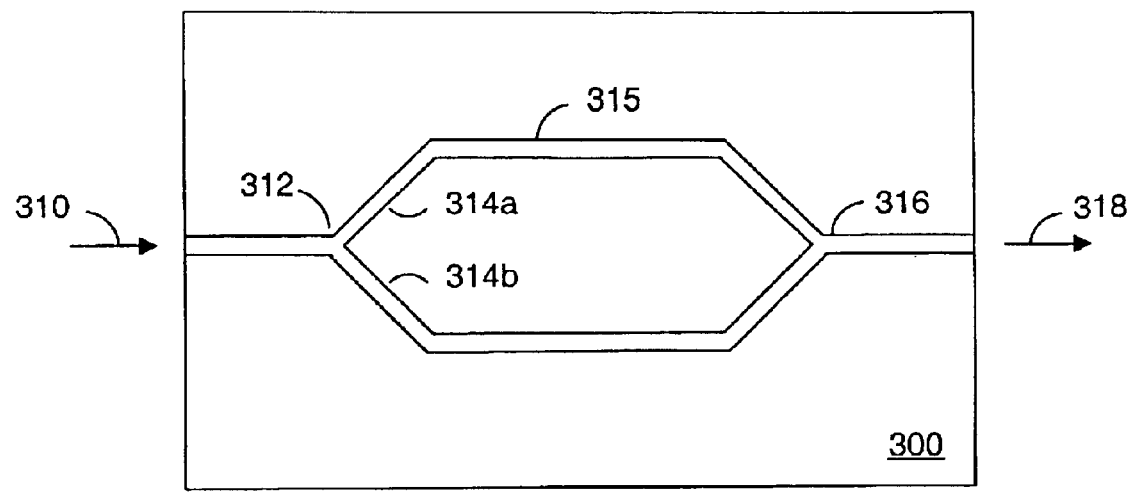
FIG. 8 is a schematic diagram of one embodiment of an interferometric device 300, such as a Mach Zehnder device, that is substantially polarization insensitive by satisfying Equation 2.

FIG. 8 is a schematic diagram of one embodiment of an interferometric device 300, such as a Mach Zehnder device, that is substantially polarization insensitive by satisfying Equation 2. In an interferometric device, a light signal is split. Part of the light signal travels one path, and part of the light signal travels a second path. The two light signals are later recombined. Correcting for birefringence is important to proper operation of the device.

In the example interferometric device, an optical signal input 310 enters the Mach Zehnder structure 300 and is split by a coupler splitter 312. In one embodiment, the coupler splitter 312 is a 3 db coupler and the optical signal is split with equivalent portions directed into waveguides 314a and 314b. Waveguide 314a is coupled to a phase modulator portion 315, in which the phase of the optical signal is modulated by voltage applied to electrodes (not shown) of the phase modulator changing the index of refraction of the optical medium. The split optical signals from the phase modulator portion 315 and the lower waveguide 314b are recombined through coupler 316, at which, depending on the difference in phases of the two split optical signals, the signal out 318 may be either intensified by constructive interference or canceled by destructive interference. In one embodiment, the entire Mach Zehnder structure is implemented on a silicon substrate, however, the structure could alternatively be implemented using other materials.

In one embodiment, the waveguides of the interferometric device have geometrical properties and/or refractive index properties that satisfy Equation 2. The geometrical properties of the waveguide and/or the refractive index properties of the waveguides may vary smoothly or in steps to satisfy Equation 2.

Thus, a method and apparatus for reducing the polarization sensitivity of a planar lightwave circuit is disclosed. However, the specific embodiments and methods described herein are merely illustrative. For example, although some embodiments were described with respect to SOS technology, the embodiments are not limited to that technology. Numerous modifications in form and detail may be made without departing from the scope of the invention as claimed below. The invention is limited only by the scope of the appended claims.

What is claimed is:

1. A planar lightwave circuit comprising:

an input optical path;

an output optical path; and a plurality of waveguides coupling the input optical path to the output optical path, the plurality of waveguides having a refractive index property to make the plurality of waveguides substantially polarization insensitive, said refractive index property comprising:

a dopant level that varies across a length of each of said plurality of waveguides.

2. The planar lightwave circuit as recited in claim 1, wherein said dopant level is symmetric from one side of each of said plurality of waveguides to an opposite side.

3. The planar lightwave circuit as recited in claim 1, wherein said dopant level is asymmetric from one side of each of said plurality of waveguides to an opposite side.

4. The planar lightwave circuit as recited in claim 1 wherein said dopant level varies steps across a length of each of said plurality of waveguides.

5. The planar lightwave circuit as recited in claim 1 wherein said dopant level varies smoothly across a length of each of said plurality of waveguides.

6. The planar lightwave circuit as recited in claim 1 wherein said plurality of waveguides comprise part of a Mach Zehnder structure.

7. A method of making a planar lightwave circuit, comprising:

providing an input optical path;

providing an output optical path; and varying a dopant level across a length of each of a plurality of waveguides coupling the input optical path to the output optical path, said dopant level varying a refractive index property across the length of each of said plurality of waveguides making the planar lightwave circuit substantially polarization insensitive.

8. The method as recited in claim 7, wherein the dopant level is symmetric from one side of each of said plurality of waveguides to an opposite side.

9. The method as recited in claim 7, wherein the dopant level is asymmetric from one side of each of said plurality of waveguides to an opposite side.

10. The method as recited in claim 7, wherein said dopant level varies in steps across a length of each of said plurality of waveguides.

11. The method as recited in claim 7 wherein said dopant level varies smoothly across a length of each of said plurality of waveguides.

12. The method recited in claim 7, wherein said plurality of waveguides comprise part of a Mach Zehnder structure.

* * * * *

UNITED STATES PATENT AND TRADEMARK OFFICE
CERTIFICATE OF CORRECTION

PATENT NO. : 6,778,750 B2
DATED : August 17, 2004
INVENTOR(S) : Vodrahalli et al.

It is certified that error appears in the above-identified patent and that said Letters Patent is hereby corrected as shown below:

Column 4,
Line 33, delete "13" and insert -- $I_3$ --.

Signed and Sealed this

Fifteenth Day of February, 2005

JON W. DUDAS
*Director of the United States Patent and Trademark Office*